US006323466B1

(12) United States Patent
Tesfagaber

(10) Patent No.: US 6,323,466 B1
(45) Date of Patent: Nov. 27, 2001

(54) PORTABLE STOVE

(76) Inventor: Zekarias K. Tesfagaber, 18329 Ashworth Ave., N., Shoreline, WA (US) 98133

(*) Notice: Subject to any disclaimer, the term of this patent is extended or adjusted under 35 U.S.C. 154(b) by 0 days.

(21) Appl. No.: 09/545,280

(22) Filed: Apr. 7, 2000

(51) Int. Cl.[7] .................................................. H05B 3/68
(52) U.S. Cl. ................................ 219/452.11; 219/443.1
(58) Field of Search ........................... 219/443.1, 451.1, 219/452.11, 453.11, 453.12, 454.11, 454.12, 468.1, 468.2, 429, 432, 433, 436

(56) References Cited

U.S. PATENT DOCUMENTS

| D. 98,922 | 3/1936 | Farber . | |
|---|---|---|---|
| 1,174,030 | * 2/1916 | Hadaway, Jr. | 219/451.1 |
| 1,674,692 | 6/1928 | McHugh et al. . | |
| 1,681,142 | * 8/1928 | Wolcott | 219/443.1 |
| 1,700,087 | * 1/1929 | Slade | 219/451.1 |
| 3,252,407 | * 5/1966 | Buerki | 219/450.1 |
| 3,505,498 | 4/1970 | Shevlin | 219/385 |
| 3,700,856 | * 10/1972 | Kullman | 219/453.11 |
| 3,761,680 | * 9/1973 | Ingrao | 219/453.1 |
| 4,195,560 | * 4/1980 | DuBois et al. | 219/448.11 |
| 4,196,342 | 4/1980 | Chailloux | 219/385 |
| 4,425,720 | 1/1984 | Elevitch | 34/233 |
| 4,481,408 | 11/1984 | Scheufler | 219/460 |
| 5,996,480 | 12/1999 | Kelley et al. | 99/468 |

FOREIGN PATENT DOCUMENTS 538543    8/1941   (GB) .

\* cited by examiner

*Primary Examiner*—Sang Paik
(74) *Attorney, Agent, or Firm*—Joan H. Pauly

(57) ABSTRACT

Upper and lower housing portions 4, 6, and 8 are connected together around a reduced width interface 10. An electric heating element 38 projects upwardly from the top to allow containers of various sizes to be placed on the element 38. The element 38 has a plug-in connector 40 received into a receptacle 44 carried by a side projection 6 of the housing. An electric conductor 46 extends inside the housing from the receptacle 44 down into a switch 48 mounted on the lower housing portion 8. The stove housing is dimensioned to position the element to be readily accessible by a person seating on the ground or a chair when the stove is resting on the ground, and also to be readily accessible to a person standing adjacent to a table on which the stove is resting. The height of the lower portion is sufficient to isolate a surface on which the stove is resting from excessive heat.

9 Claims, 5 Drawing Sheets

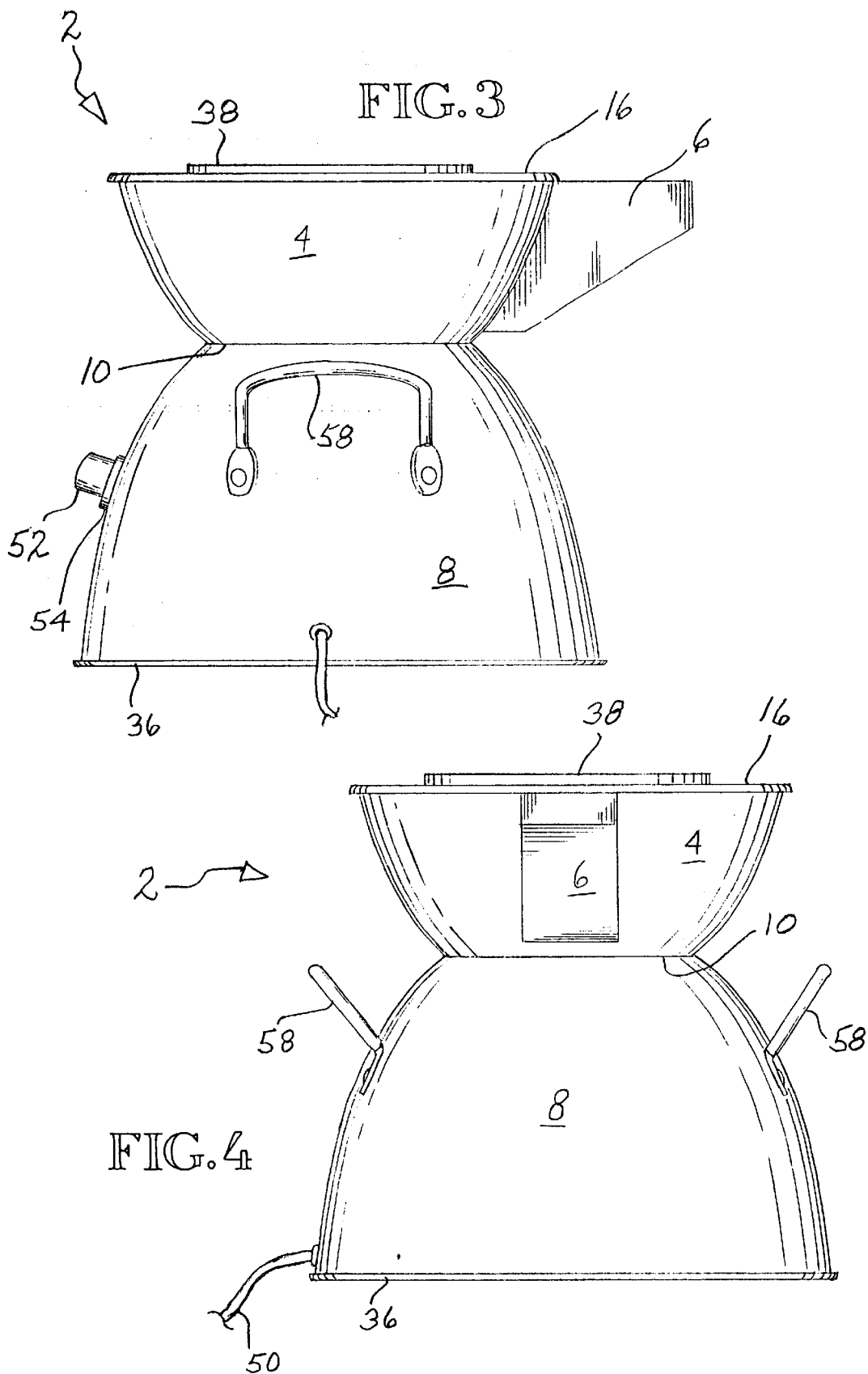

PORTABLE STOVE

TECHNICAL FIELD

This invention relates to portable stoves and, more particularly, to a stove suitable for use in roasting coffee, keeping beverages warm, and heating and cooking other consumables and configured to be used safely when resting on various types of surfaces, including tabletops and carpeted floors and other ground surfaces.

BACKGROUND INFORMATION

The ceremonial roasting and drinking of coffee has been an important social custom in parts of East Africa for a considerable period of time in excess of several decades. Traditionally, the coffee was roasted and brewed on a stove heated by means of charcoal. The stove would typically be used in an outdoor environment or an indoor environment with an earthen floor. The stove would be placed on the outside ground surface or the ground surface formed by the earthen floor.

In more recent environments, social ceremonies are more likely to take place indoors where the floor surface is other than earthen. The floor surface may be, for example, wood or carpet that could be damaged by high heat. Moreover, it has become well known that the burning of charcoal indoors presents a serious health hazard due to the production of carbon monoxide.

It is the goal of the present invention to provide a portable stove that is suitable for use in coffee ceremonies and for other purposes in indoor environments.

BRIEF SUMMARY OF THE INVENTION

According to the invention, a stove for heating consumables comprises a housing having an upper portion, and a lower portion connected to the upper portion around a reduced width interface. An electric heating element is positioned in a top portion of the upper portion and projects upwardly therefrom to allow containers of various sizes to be placed on the element. The various sizes include those having a width greater than that of the upper portion. The element has a plug-in connector projecting laterally therefrom. The stove also includes a receptacle carried by a side portion of the upper portion. The receptacle is configured to receive the connector and connect the connector, and thereby the element, to a source of electricity. The housing is dimensioned to position the element to be readily accessible by a person seated on a ground surface or on a chair when the stove is resting on the ground surface. The dimensioning of the housing is also such that the element is readily accessible to a person standing adjacent to a table on which the stove is resting. The lower portion of a housing is hollow and has a height sufficient to isolate a surface on which the stove is resting from excessive heat generated by the element.

As used herein, the term "consumables" is intended to be broadly construed to include water, coffee and other beverages, and various types of food or other substances that are consumed by humans or other living creatures. The term "source of electricity" includes electric wiring that provides a conductive path that ultimately is connected or connectable to an electric outlet or an equivalent thereof. The term "ground surface" includes various types of natural and man-made outdoor surfaces as well as various types of indoor surfaces commonly found in inhabited structures. The latter include tile, wood, carpeted, concrete, and other types of known floor surfaces and floor coverings. The term "excessive heat" means a degree of heat sufficient to be likely to cause damage to a ground surface.

In its preferred form, the stove of the invention includes an on/off switch mounted on the lower portion of the housing and operatively accessible from outside the housing. An electric conductor extends inside the housing from the receptacle into the upper portion and down into the lower portion to the switch. A power cord extends from the switch and out of the housing.

The switch preferably includes a dial positioned outside the housing and having a radial flange. The flange has an inner radial surface that is at least substantially flush with an outer surface of the lower portion of the housing. This arrangement helps prevent accidents caused by items snagging on the switch.

Preferably, the upper portion of the housing includes a main portion in which the electric heating element is positioned, and a side projection that encloses the receptacle. Also preferably, a pair of handles is positioned on opposite outer portions of the housing to enable the stove to be carried by a user.

The invention provides a stove that meets the goal stated above of suitability for use in various environments. The is stove is sufficiently versatile to be used either indoors or outdoors and to be used resting on various types of surfaces, including indoor floor surfaces and elevated support surfaces, such as the tops of tables. The stove incorporates features found in full size stationary cooking ranges to provide safe and reliable operation. At the same time, the portability and versatility of the stove is maintained. Overall, the stove of the invention is attractive and easy to use and clean. It may also be conveniently stored when it is not in use.

BRIEF DESCRIPTION OF THE DRAWINGS

In the drawings, like element designations refer to like parts throughout, and:

FIG. 3 is a side elevational view of the preferred embodiment.

FIG. 4 is a rear elevational view of the preferred embodiment.

DETAILED DESCRIPTION OF THE INVENTION

Figure 1:
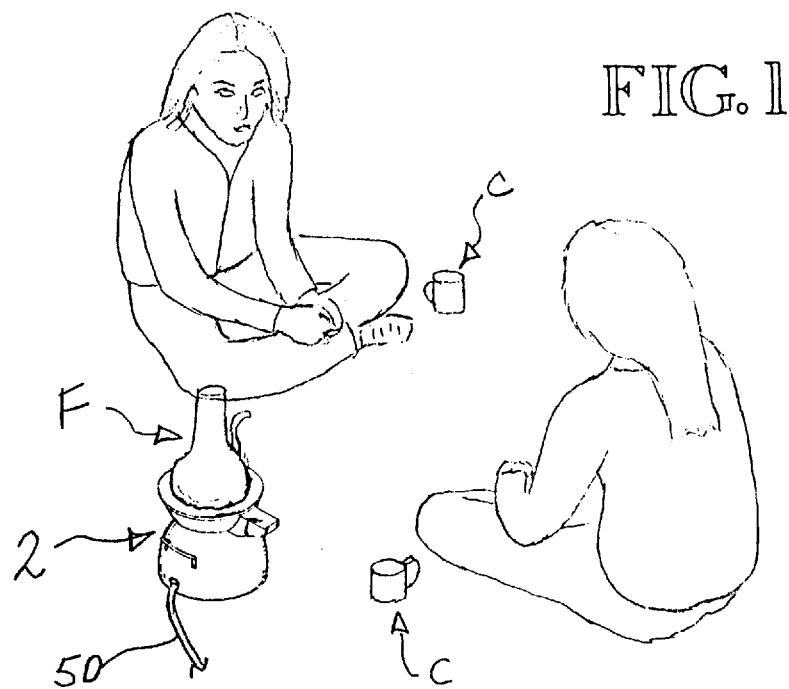
FIG. 1 is a pictorial view of two people seated on the ground and using the preferred embodiment of the invention for keeping a flask of coffee warm.

The drawings show a portable stove 2 that is the currently preferred embodiment of the invention and that constitutes the best mode of the invention currently known to the applicant. FIG. 1 shows the stove 2 in use by two people seated on a ground surface on which the stove 2 is resting.

Each person has a cup C for drinking coffee. A flask F for coffee is positioned on the stove 2 to warm the coffee in the flask. The ground surface may be either an indoor surface or an outdoor surface. It is intended to be understood that the use environment illustrated in FIG. 1 is only one of many use environments in which the stove of the invention may be used to advantage. The stove may be used for heating various types of consumables for the purpose of cooking or roasting the consumables or keeping them warm.

Figure 7:
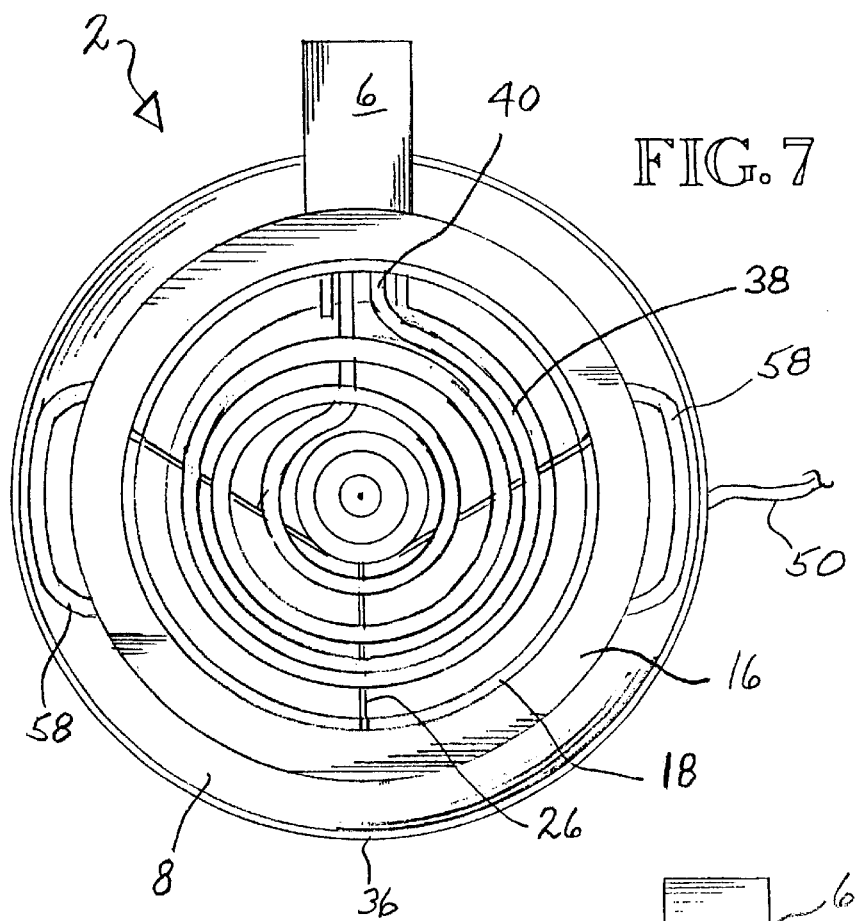
FIG. 7 is a top plan view of the preferred embodiment.
Figure 8:
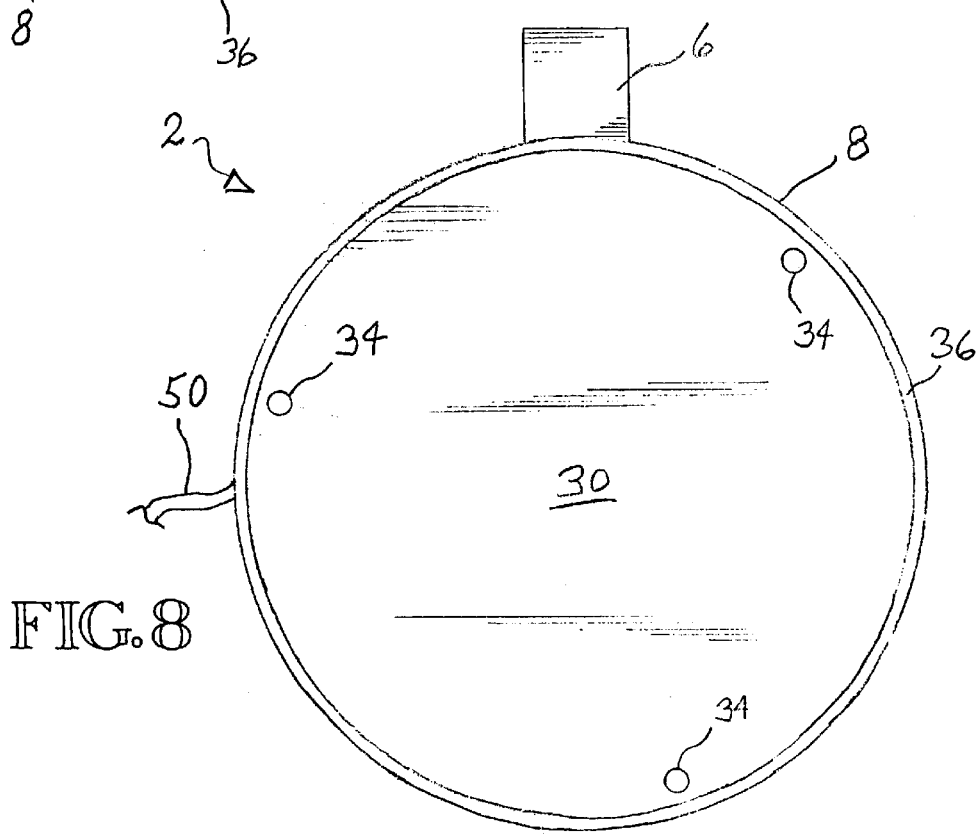
FIG. 8 is a bottom plan view of the preferred embodiment.
Figure 9:
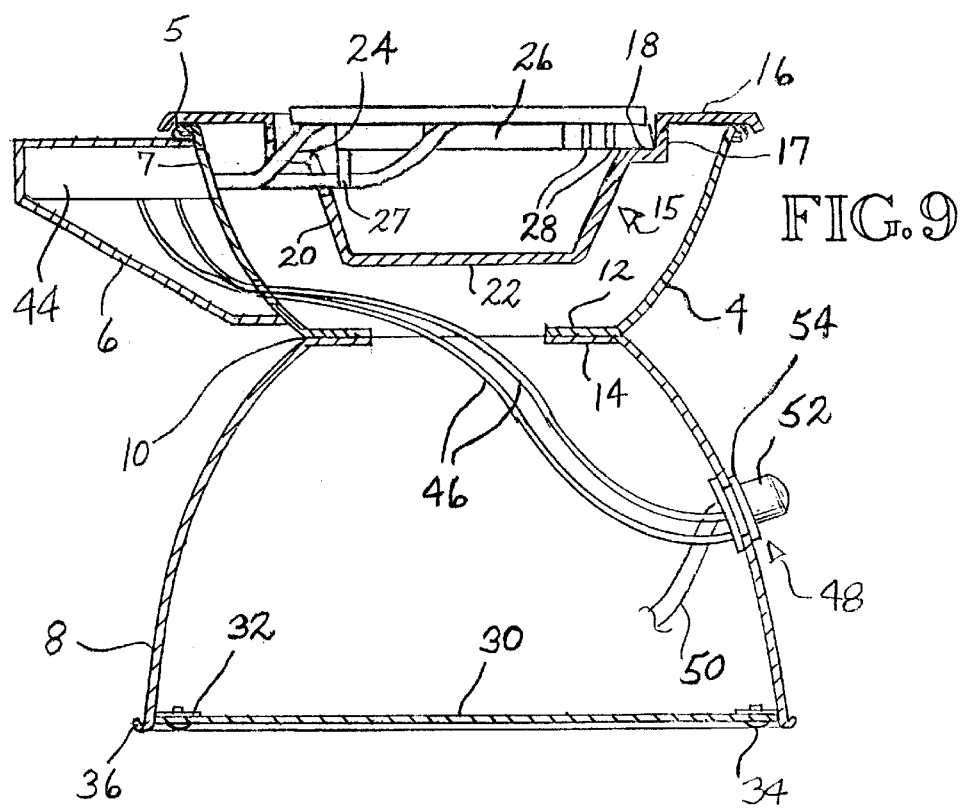
FIG. 9 is a vertical sectional view of the preferred embodiment, with parts shown in elevation.

The preferred embodiment of the stove 2 is shown in more detail in FIGS. 2–10. The stove 2 includes a housing having an upper portion 4, 6 and a lower portion 8. The upper portion includes a main portion 4 and a side projection 6 projecting laterally from the main portion 4. A side opening 7 (FIG. 9) provides communication between the interior of side projection 6 and the space defined by main portion 4. The lower portion 8 is connected to the main portion 4 of the upper portion 4, 6 around a reduced width interface 10. Overall, the configuration of the main portion 4 and lower portion 8 resembles that of an hourglass with the upper portion of the hourglass being smaller than the lower portion and having a side projection. Each of the main portion 4 and lower portion 8 has a shape that may be regarded as frustoconical with a curved, rather than a linearly sloping, sidewall. The main upper portion 4 and lower portion 8 are provided with radially inwardly extending top and bottom flanges 12, 14, respectively, at the interface 10. The flanges 12, 14 are best seen in FIG. 9 and provide a convenient means for securing the upper portion 4, 6 and lower portion 8 together. This may be done by any of a variety of known means, such as by the use of rivets (not shown).

The top of the main upper portion 4 is open and has a rolled edge 5. A drip pan 15 extends downwardly into the main portion 4. The pan 15 has a top radially extending annular flange 16 that, near its outer circumferential edge rests on the rolled edge 5 of the top of the main portion 4. The outer circumferential edge of the rim 16 extends downwardly around the rolled edge 5 to help keep it in position and give the stove a more finished appearance. At the radially inner edge of the rim 16, the pan 15 has a short vertically extending sidewall portion 17. At the bottom of the portion 17, the sidewall extends radially inwardly to form an annular shoulder 18. Below the shoulder 18, the pan 15 has a vertically extending and radially inwardly tapering sidewall 20 that terminates in a substantially flat bottom wall 22. The sidewall 20 and bottom wall 22 together form a generally cup-shaped pan for catching drippings from an electric heating element 38, described further below. A side opening 24 in the pan walls 17, 18, 20 is aligned with the side opening 7 in the main portion sidewall 4. The shoulder 18 provides a support for peripheral portions of a heating element spider support 26. The spider 26 is attached to the heating element 38 by a clip 27 carried by the spider 26 and clips 28 carried by the heating element 38. The clip 27 and two of the clips 28 can be seen in FIG. 9.

The bottom of the housing, or more specifically the bottom of the lower portion 8, is closed by a bottom plate 30. The lower housing portion 8 has a rolled bottom edge 36 to round off what would otherwise be a sharp bottom edge. Three circumferentially spaced connector tabs 32 extend radially inwardly from the inside surface of the sidewall of the lower housing portion 8 just above the rolled bottom edge 36. These tabs 32 provide a means for removably attaching the bottom plate 30 to the lower housing portion 8. The connection is made by means of screws 34, as shown in FIGS. 8 and 9.

Figure 2:
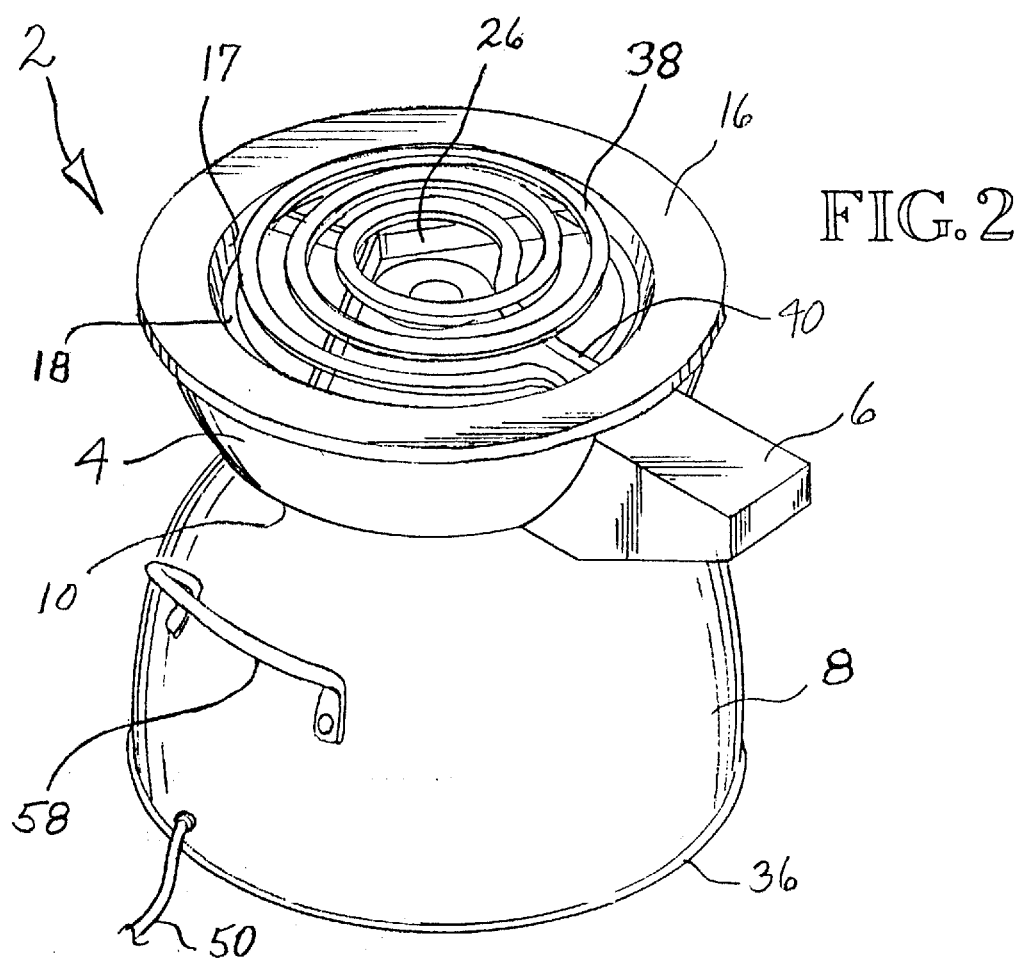
FIG. 2 is a pictorial view of the preferred embodiment.
Figure 5:
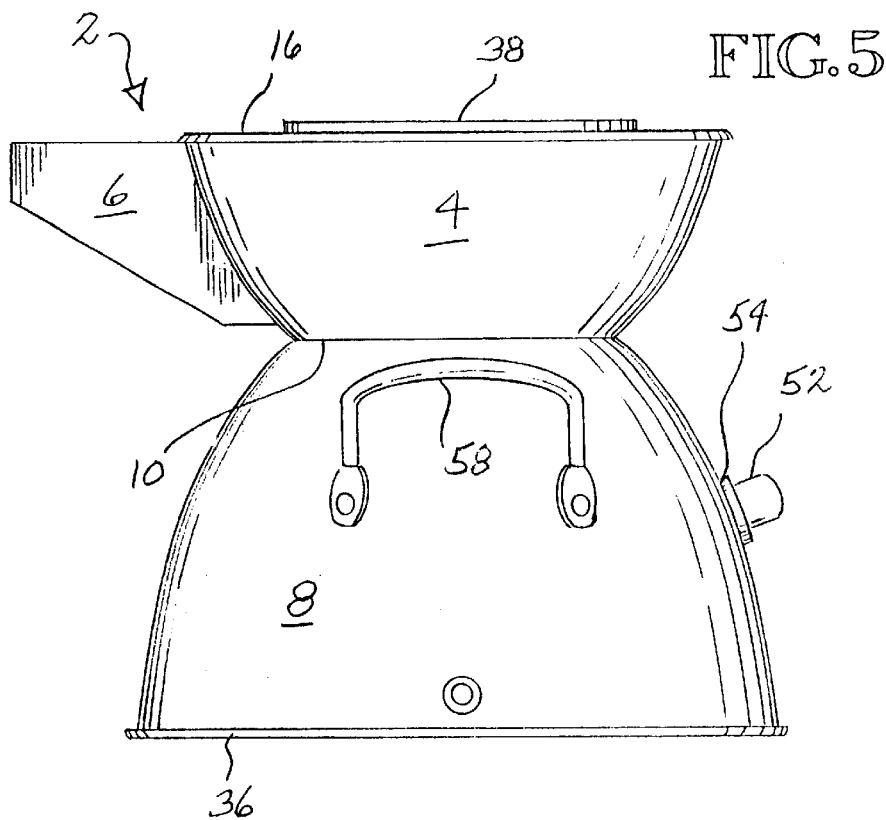
FIG. 5 is a side elevational view showing the side opposite that shown in FIG. 3.
Figure 6:
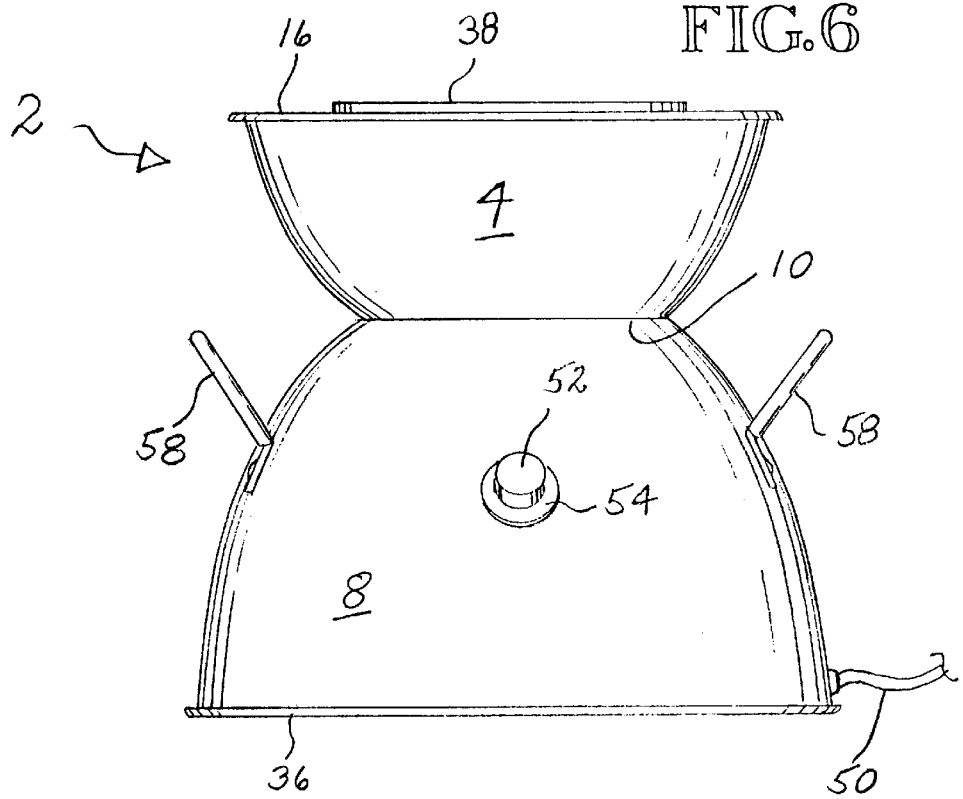
FIG. 6 is a front elevational view of the preferred embodiment.

The electric heating element 38 mentioned above is positioned in the top portion of the main upper housing portion 4 and projects upwardly therefrom through the center opening defined by the annular top rim 16 of the drip pan 15. The upward projecting of the element 38 allows containers of various sizes to be placed on the element 38. Such sizes include sizes having a width greater than that of the greatest width of the upper housing portion 4, i.e. its width at its top. The element 38 has a known spiral configuration, as shown in FIGS. 2 and 7. A plug-in connector 40 projects laterally from the element spiral. The connector 40 includes two prongs extending from the outer and inner ends of the spiral, respectively.

A receptacle 44 is carried by a side portion, more specifically the side projection 6, of the upper housing portion 4, 6. The side projection 6 encloses the receptacle 44, as best seen in FIG. 9. The receptacle 44 is aligned with the openings 7, 24 and is configured to receive the connector 40 of the heating element 38, and connect the connector 40, and thereby the element 38, to a source of electricity. The details of the structure of the plug-in connector 40 and the receptacle 44 therefor may take various known forms.

Figure 10:
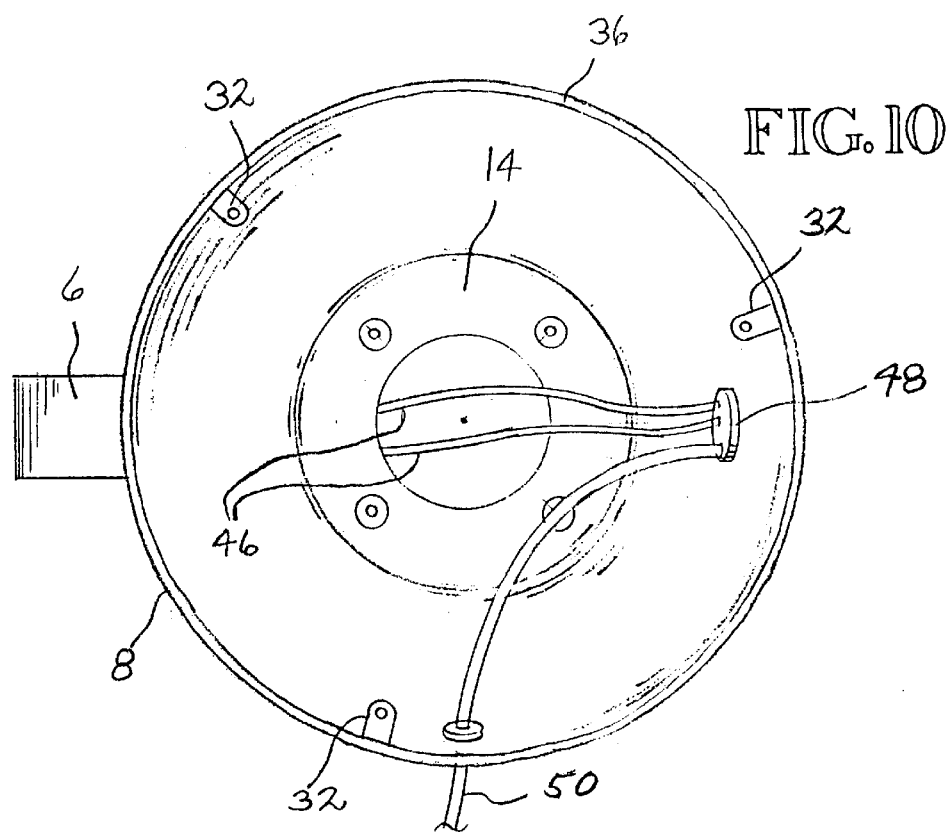
FIG. 10 is a bottom plan view of the preferred embodiment with the bottom protective plate omitted.

The elements that form the path to the ultimate source of electricity within the stove 2 are best seen in FIGS. 9 and 10. These elements include an electric conductor 46 extending inside the housing from the receptacle 44 into the main upper housing portion 4 below the drip pan 15 and down into the lower housing portion 8 to an on/off switch 48. As seen in FIGS. 9 and 10, the conductor comprises two wires 46. The switch 48 is mounted on the lower housing sidewall 8. The switch 48 has an inner portion into which the wires 46 extend and from which a power cord 50 also extends. The power cord 50 extends inside the housing from the switch 48 to a location spaced circumferentially about 90 degrees from the switch 48 and vertically adjacent to the rolled bottom edge 36. At this location, the cord 50 extends out of the housing through the lower sidewall 8. The outer end of the cord 50 (not shown) has a conventional plug thereon for plugging the cord 50 into an electric outlet, such as an outlet of a type commonly found on the walls of structures for plugging in various appliances. The positioning of the exit of the cord 50 from the stove 2 near the bottom of the stove 2 helps prevent accidental displacement or tipping of the stove 2 by unintended contact with the cord 50.

Referring particularly to FIGS. 3, 5, 6, and 9, the switch 48 has an external portion that includes a dial 52 projecting from the outer surface of the lower housing portion 8 to be accessible for operation by a user from outside the housing. The dial 52 has a radially outwardly extending flange 54 with an inner radial surface that is at least substantially flush with the outer surface of the lower housing portion 8. As noted above, the flush mounting of the flange 54 helps prevent accidents caused by items snagging on the switch 48.

The housing of the stove 2 is dimensioned to position the heating element 38 to be readily accessible by a person seated on a ground surface, as illustrated in FIG. 1, or on a chair when the stove 2 is resting on the ground surface. The dimensioning is also such that the element 38 is readily accessible to a person standing adjacent to a table on which the stove 2 is resting. The lower housing portion 8 is hollow, as best seen in FIG. 9. The dimensioning of the lower portion 8 is an important feature of the invention. It is dimensioned to have a height sufficient to isolate a surface on which the stove 2 is resting from excessive heat generated by the element 38. As described above, "excessive heat" indicates a degree of heat sufficient to be likely to cause damage to a ground surface. The dimensioning of the lower housing portion 8 to avoid such damage contributes to the advantageous versatility of the stove 2 and allows it to be used when resting on various types of surfaces. Such surfaces include indoor wooden and carpeted surfaces and surfaces with floor coverings, as well as more heat and/or damage resistant surfaces. In the preferred embodiment, the bottom plate 30 remains substantially at room temperature when the stove 2 is in use.

The overall structure of the stove 2, including its dimensioning, is also designed to make the stove completely portable and easily carried by a user from one location to another. In order to facilitate carrying, the stove 2 is preferably provided with a handle or handles. As shown in FIGS. 1–7 and best seen in FIGS. 4 and 6, the preferable form for the handles is a pair of handles 58 positioned on opposite outer portions of the housing. These handles 58 allow a user to carry the stove 2 using two hands, one gripping each handle 58, to lift, carry, and set down the stove 2. The stove 2 may be easily cleaned and stored. Cleaning is facilitated by removing the drip pan 15 and washing it separately.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A stove for heating consumables, comprising:
a housing having an upper portion, and a lower portion connected to the upper portion around a reduced width interface;
an electric heating element positioned in a top portion of said upper portion and projecting upwardly therefrom to allow containers of various sizes, including sizes having a width greater than that of said upper portion, to be placed on said element, said element having a plug-in connector projecting laterally therefrom; and
a receptacle carried by a side portion of said upper portion and configured to receive said connector and connect said connector, and thereby said element, to a source of electricity;
said housing being dimensioned to position said element to be readily accessible by a person seated on a ground surface or on a chair when the stove is resting on said ground surface, and to be readily accessible to a person standing adjacent to a table on which the stove is resting; and
said lower portion being hollow and having a height sufficient to isolate a surface on which the stove is resting from excessive heat generated by said element to avoid damage to the surface caused by heat generated by said element, said height being sufficient to avoid damage to an indoor wooden surface and to an indoor carpeted surface.

2. The stove of claim 1, comprising an on/off switch mounted on said lower portion and operatively accessible from outside said housing, an electric conductor extending inside said housing from said receptacle into said upper portion and down into said lower portion to said switch, and a power cord extending from said switch and out of said housing.

3. The stove of claim 2, wherein said switch includes a dial positioned outside said housing and having a radial flange with an inner radial surface that is at least substantially flush with an outer surface of said lower portion.

4. The stove of claim 1, wherein said upper portion includes a main portion in which said element is positioned, and a side projection that encloses said receptacle.

5. The stove of claim 4, comprising an on/off switch mounted on said lower portion and operatively accessible from outside said housing, an electric conductor extending inside said housing from said receptacle into said upper portion and down into said lower portion to said switch, and a power cord extending from said switch and out of said housing.

6. The stove of claim 5, wherein said switch includes a dial positioned outside said housing and having a radial flange with an inner radial surface that is at least substantially flush with an outer surface of said lower portion.

7. The stove of claim 1, comprising a pair of handles positioned on opposite outer portions of said housing to enable the stove to be carried by a user.

8. The stove of claim 4, comprising a pair of handles positioned on opposite outer portions of said housing to enable the stove to be carried by a user.

9. The stove of claim 1, wherein said lower portion includes a bottom plate, and said bottom plate remains substantially at room temperature when the stove is in use.

\* \* \* \* \*